United States Patent [19]

Wood

[11] Patent Number: 5,394,468
[45] Date of Patent: Feb. 28, 1995

[54] ADAPTER FOR TELEPHONE POSTS

[76] Inventor: William L. Wood, 57 N. Boxwood St., Hampton, Va. 23669

[21] Appl. No.: 38,885

[22] Filed: Mar. 29, 1993

[51] Int. Cl.⁶ .................... H04M 1/00; E04F 19/00
[52] U.S. Cl. ................................ 379/453; 52/27.5
[58] Field of Search .............. 379/441, 451, 454, 453, 379/437, 438; 312/223.4; 52/27.5

[56] References Cited

U.S. PATENT DOCUMENTS

| | | |
|---|---|---|
| D. 223,815 | 6/1972 | Ericsson . |
| D. 262,762 | 1/1982 | McGarvey . |
| 2,982,593 | 5/1961 | Chambers . |
| 3,338,002 | 8/1967 | Ericsson . |
| 3,511,941 | 1/1967 | Quigley ............... 379/454 |
| 3,543,454 | 12/1970 | Danin . |
| 4,396,176 | 8/1983 | Hannula ............... 379/453 |
| 4,754,582 | 7/1988 | Cameron . |
| 5,020,103 | 5/1991 | Holland . |

OTHER PUBLICATIONS

Phillips & Brooks, Inc., Telephone Enclosures Sep. 10, 1982.

Primary Examiner—James L. Dwyer
Assistant Examiner—Jack Chiang
Attorney, Agent, or Firm—Wallace J. Nelson

[57] ABSTRACT

An adapter unit permitting installation of multiple pay telephone units on an existing telephone post that is designed to support only one or two telephone units, is disclosed. The adapter unit is provided with a hollow, rectangular, box housing having four sides, a closed top end and an open bottom end. One of the sides of the adapter is releasably secured to an existing telephone post via integral brackets leaving the remaining three sides of the housing exposed. Each of the three exposed sides is provided with spaced, adjustable length, bolts extending therefrom to permit attachment of individual pay phone mounting fixtures thereto. An adjustable length support leg has a first end slidably received within the hollow housing and is provided with a ground contact plate on the other end thereof. Height adjustment bracket is provided for the support leg inside the open hollow housing to permit height adjustment of the support leg for diverse or non-level terrain.

10 Claims, 2 Drawing Sheets

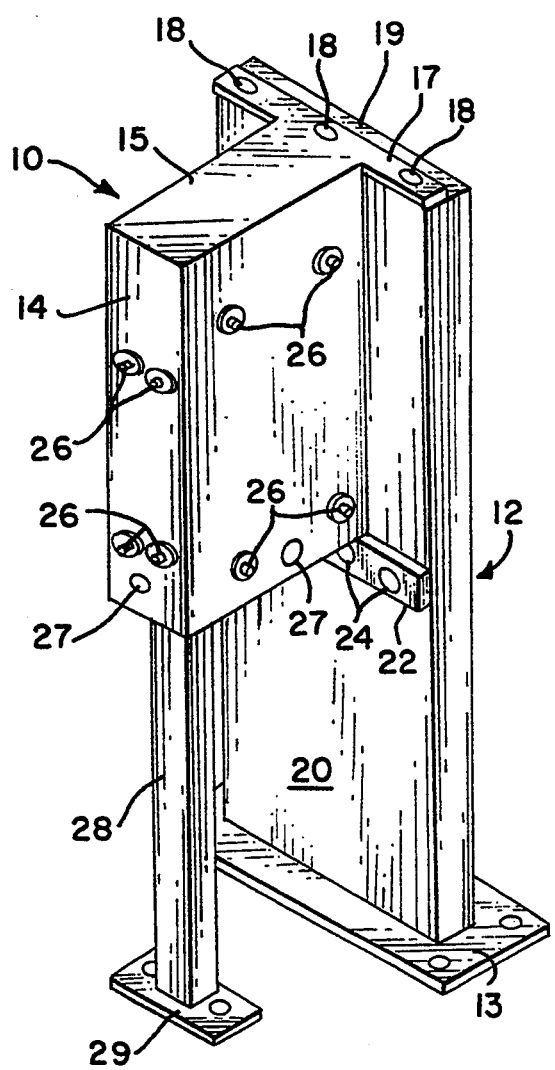
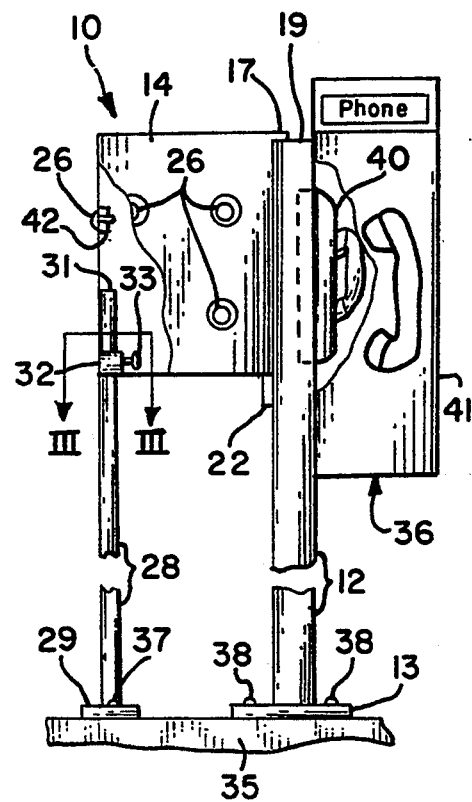
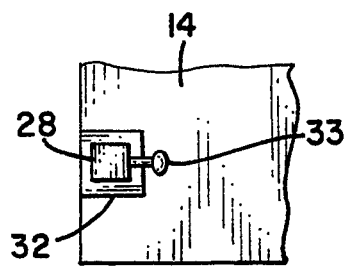
FIG. 1
FIG. 2
FIG. 3

1

ADAPTER FOR TELEPHONE POSTS

FIELD OF THE INVENTION

This invention relates to telephone installation in general and relates specifically to an adapter unit to permit the installation of additional pay telephone units to an existing telephone post designed for mounting of only one or two pay telephone units.

BACKGROUND OF THE INVENTION

It is common practice to mount pay telephones on posts attached to or embedded in a concrete surface adjacent shopping malls, convenience stores or other high traffic areas. These telephone posts have proved more economical and less subject to vandalism than conventional individual telephone booths previously employed in public access areas. After installation, it is frequently found that the volume of phone business at a particular location dictates the need for additional pay phones. Even if space is available for the additional phone posts, the cost of installing same far exceeds the cost involved in adding additional phone(s) to an existing post. There is thus a definite need in the art for structure that permits the installation of multiple additional pay phone units to an existing single phone post.

It is therefore an object of the present invention to provide an adapter unit releasably attached to a single existing telephone post that permits the installation of one, two or three additional pay phones thereon.

Another object of the present invention is an adapter unit for use with an existing telephone post to support one or more additional pay phones.

An additional object of the present invention is an adapter unit for use with an existing telephone post to support one or more additional pay phones at diverse heights to permit use by handicapped individuals and curbside drive-up access.

SUMMARY OF THE INVENTION

According to the present invention the foregoing and additional objects are attained by providing an adapter unit provided with a rectangular hollow housing having four side surfaces and provided with a closed top end and an interior accessible bottom end. A top mounting bracket integrally extends horizontally from the closed top end and adjacent to a first one of the side surfaces of the hollow housing. The top mounting bracket is bolted, or otherwise, releasably attached to the top end of an existing telephone post to position the first side surface of the hollow housing in contact and flush with a side surface of the phone post, while leaving the remaining side surfaces of the hollow housing exposed.

A bottom mounting bracket integrally extends from the first hollow housing side surface and is releasably attached to the flush side surface of the existing phone post. An elongated support leg is provided with a first ground engaging end extending from the accessible bottom end of the hollow housing and a second end extending through the accessible bottom end into the hollow housing. The ground engaging end of the support leg is provided with an integral flat plate that is adapted to rest against the ground, a concrete slab or other support area from which the existing telephone post extends. The second end of the support leg is slidably received within a bracket attached to the interior of the hollow housing. A suitable set screw extends through the bracket to engage the second end area of the support leg to permit selective height adjustment thereof for diverse and unlevel terrain.

A plurality of adjustable bolts, extend in selective spaced relationship from each of the three exposed surfaces of the adapter unit. These bolts provide attachment structure for mounting fixtures employed to secure additional individual phone units to the adapter. The electric and phone wiring for the additional phone units is obtained from that provided to the existing phone post, from underground or overhead sources, in a conventional manner.

BRIEF DESCRIPTION OF THE DRAWINGS

A more complete appreciation of the invention and many of the attendant advantages thereof will be better understood when considered in connection with the accompanying drawings wherein:

FIG 1 is a perspective view of the telephone post adapter of the present invention secured to a conventional telephone support post;

FIG. 2 is a side view of the telephone post adapter shown in FIG. 1 with parts broken away and showing the adapter of the present invention attached to a post supporting a single pay telephone;

FIG. 3 is a part sectional view taken along line III—III of FIG. 2;

DETAILED DESCRIPTION

Figure 4:
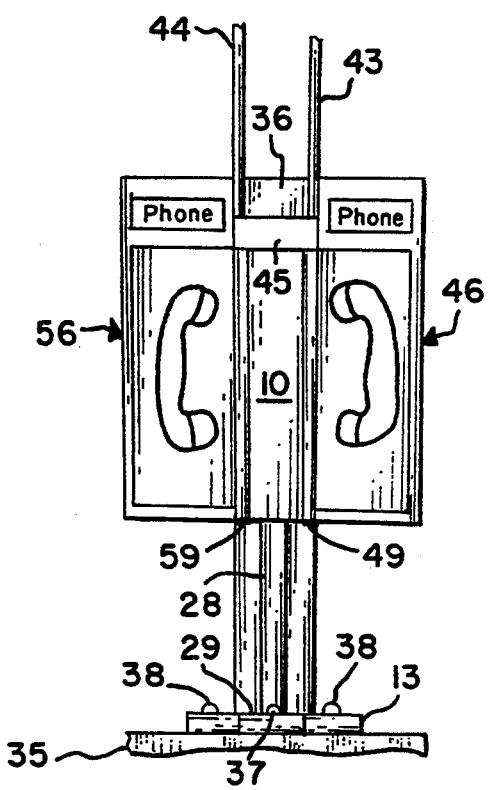
FIG. 4 is an end view of the telephone post adapter shown in FIG. 2 and illustrating two additional telephone units attached thereto.

Referring now to the drawings and more particularly to FIG. 1, the telephone post adapter unit of the present invention, designated generally by reference numeral 10, is shown attached to a conventional telephone support post 12. Telephone support post 12 is provided with a pedestal or base plate 13 that may be embedded in concrete or bolted to a concrete or other firm support surface.

Adapter unit 10, in the preferred embodiment, is in the form of a hollow rectangular box housing 14 provided with a closed top end 15 and an open bottom end, not designated. A top mounting bracket 17, integral with top end 15 extends horizontally therefrom. A plurality of suitable bolts 18 serve to secure adapter unit 10 to the top 19 of support post 12, with one of the narrow side surfaces of housing 14 being in flush contact with the aft side 20 of post 12.

A bottom mounting bracket 22 integrally extends from the narrow side surface of housing 14 in contact with post 12. A plurality of bolts 24 extend through bottom mounting bracket 22 into aft side 20 of post 12.

A plurality of attachment bolts 26 are disposed in spaced relationship and provided with enlarged heads extending from each of the three remaining exposed surfaces of hollow rectangular housing 14, as will be further explained hereinafter. Instead of, or in addition to, enlarged heads, bolts 26 may be provided with suitable large diameter washers (not shown).

An elongated support leg 28 extends from the open bottom end of hollow housing 14 and is provided with a ground engaging base plate 29. The details of support leg 28 is more fully described hereinbelow in reference to FIGS. 2 and 3.

As shown in FIGS. 2 and 3, the end 31 of elongated support leg 28 extending into housing 14 is slidably received by a bracket 32. A set screw 33 extends through bracket 32 to engage and retain leg 28 at the selected length. Bracket 32 is of substantially U-shape in cross section with the ends thereof being welded or otherwise conventionally attached to the inside surface of housing 14. The adjustable length leg 28 thus provides support for housing 14 when telephone post 12 is mounted on, or adjacent, rolling or uneven surfaces. In the illustrated embodiment of FIG. 2, ground engaging plate 29 on support leg 28, and base plate 13 on telephone post 12, are bolted to a concrete support surface 35 via respective bolts 37, 38.

As illustrated in FIG. 2, adapter unit 10, in practice, is attached to a telephone post 12 having a single pay telephone unit 36 mounted thereon. Telephone unit 36 includes (1) pay phone mechanism 40, directly received within and attached to an interior mounting surface provided within telephone post 12 and (2) open box telephone writing surface structure 41. Writing surface structure 41 is provided with a closed back portion having an opening therein to slidably fit over and releasably attach, via suitable bolts (not illustrated) to pay phone mechanism 40, in a conventional manner. Telephone writing surface 41 includes a bottom writing shelf, a top, and two side flanges, all integral with the closed back portion thereof. The individual side panels may be plain or may include advertisement thereon and are conventionally formed of clear or colored glass or plastic, or of a suitable acoustic material.

As shown in dotted line (FIG. 2), a portion of pay telephone mechanism 40 extends into and is secured to an interior surface (not shown) within telephone post 12, as will be further explained hereinafter. Telephone unit 36 (consisting of pay telephone mechanism 40 and writing surface structure 41) is of conventional construction and is not described in more complete detail herein in the interest of brevity.

As described hereinbefore, a plurality of spaced attachment bolts 26 extend from each exposed side surface of adapter unit 10. Bolts 26 are removed from adapter unit 10 and positioned through suitable bolt openings provided in telephone mounting fixtures for re-engagement with adapter unit 10 for retention of additional mounting fixtures thereon, as will be further explained hereinafter. Each of bolts 26 is threadingly received by an individual nut welded to the inside surface of hollow housing 14. One of these nuts is shown in FIG. 2 and designated by reference numeral 41. Bolts 26 may be arranged in any desired pattern on hollow housing 14 that coincides with the necessary number of multiple openings provided in a specific mounting fixture. Although any desired number may be employed, four bolts 26 are normally employed to secure a telephone mounting fixture to adapter unit 10 to insure a stable and firm connection between the parts.

The electric and telephone wires are normally supplied underground to the hollow post 12 and distributed from a central distribution box (not shown) within post 12. Suitable and conventional removable panels, containing a plurality of knock-out plugs, form part of the exterior surfaces of post 12 and are not shown or described further herein in the interest of brevity. The wiring for phone unit 36 and to adapter unit 10 normally extends from post 12 through these removable panels. Alternatively, suitable bores (not shown) may be employed through the exterior surfaces of post 12 for the wiring needed for the individual phone units. The necessary wiring for each phone unit to be attached to adapter unit 10 extends from post 12 into adapter unit 10 through the accessible open bottom end thereof and from adapter unit 10 to the added individual phone units through suitable side bores 27 provided in each side of housing 14. Two such bores 27 are illustrated in FIG I with the other two not being visible in this FIG.

Two additional phone units 46 and 56 are shown secured to post 12 via respective telephone mounting fixtures 49, 59 attached to adapter unit 10 in the illustration of FIG. 4. In this particularly illustration the necessary electric and phone wiring is provided to post 12 from a supply source via overhead wires extending through conduits 43,44 attached to an electrical conduit fitting 45 secured to and providing access through the top end 19 of telephone post 12.

Figure 5:
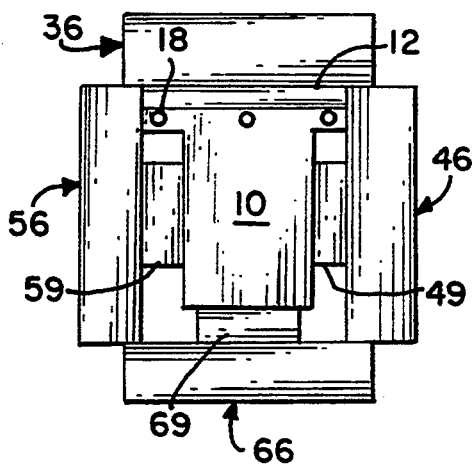
FIG. 5 is an overhead view of the telephone post adapter of the present invention illustrating the addition of three telephone units secured thereto.

Referring to FIG. 5 an overhead view of the telephone post adapter 10 is shown supporting three added telephone units 46, 56, and 66, via respective telephone mounting fixtures 49, 59 and 69, on a telephone post 12 originally supporting only one telephone unit 36.

Figure 6:
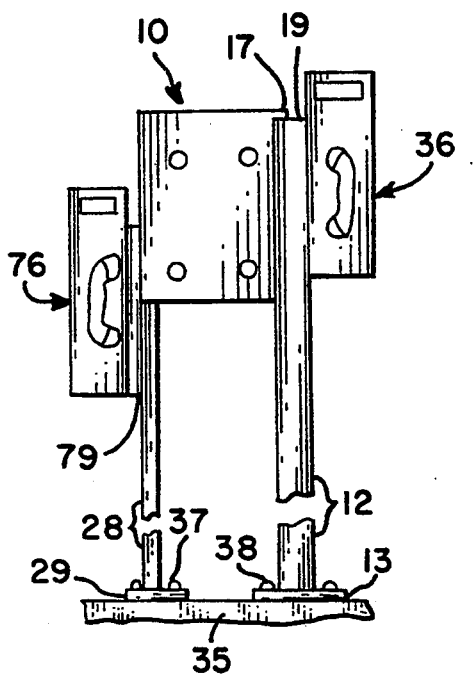
FIG. 6 is a view similar to FIG. 4 and illustrating one of the pay phone units being supported by the adapter of the present invention positioned below the normal height to facilitate use by handicapped individuals or drive-up type access.

As shown in FIG. 6, adapter unit 10 may also be employed to support at least one telephone unit 76 at a lower than normal height. This lower telephone unit 76, secured to telephone mounting fixture 79, permits telephone access to the handicap and may also be employed for curbside or drive-up use. In this embodiment, at least four bolts 26 would be provided in the lower portion of adapter unit 10 to secure mounting fixture 79 thereto at the desired height.

Figure 7:
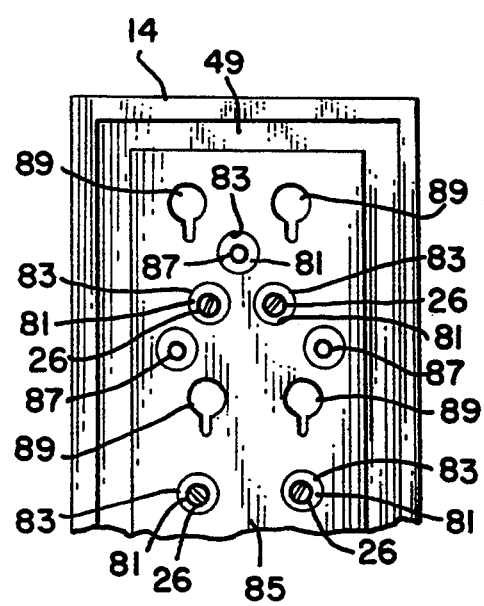
FIG. 7 is a plan view of the inside of an exemplary telephone mounting fixture as seen looking into the open front thereof.

Referring now to FIG. 7, the use of bolts 26 to connect telephone mounting fixtures 49, 59, 69 and 79 to adapter unit 10 will now be described. This inside plan view of an exemplary telephone mounting fixture 49 shows portions of aft backing 81 thereof visible through enlarged openings 83 provided in a wall 85 spaced from aft backing 81. Aft backing 81 abuts a surface on housing 14 of adapter unit 10 and is releasably fastened thereto by bolts 26. A bolt hole 87 is provided in aft backing 81 in alignment with each enlarged opening 83 of wall 85. Bolts 26 extend through holes 87 to secure telephone mounting fixture 49 to adapter unit 10. The enlarged heads or washers on bolts 26 abut against the inside surface of aft backing 81 of mounting fixture 49. As described hereinbefore, at least four bolts 26 are normally employed to secure the telephone mounting fixture 49 to adapter unit 10. Wall 85 of mounting fixture 49 is also provided with a plurality of slotted openings 89 that serve to receive a plurality of enlarged head bolts or other retention structure (not shown) on a pay phone mechanism 40, in a conventional manner. Although the mounting fixture illustrated and described in reference to FIG. 7 is fixture 49, it is to be understood that each of mounting fixtures 59, 69 and 79 are of identical construction. Although not shown, it is to be understood that the interior mounting surface within post 12, serving to receive pay phone mechanism 40, is provided with similar slotted openings therein for attachment of pay phone mechanism 40, as described hereinbefore in reference to FIG. 2.

Although no specific materials have been mentioned for making adapter unit 10, in a specific embodiment thereof welded sections of ten-gauge steel plate was employed for constructing housing 14 and one-eighth inch steel plate employed for elongated support leg 28. Bolts 26 and nuts 42 were formed of cadmium plate steel with the bolt size being three/eights by one inch. The adapter unit 10 in this specific embodiment had a length of sixteen and three/quarter inches, a width of five and three/quarter inches, and a height of twenty-seven inches. Elongated support leg 28 had a square cross section measurement of two inches and a length of thirty six inches. Top mounting bracket 17 and bottom mounting bracket 22 were each two and one half inches by ten inches. The exterior dimensions of telephone units 36, 46, 56, 66 and 76 are normally approximately eighteen inches in width and approximately twenty-eight inches in height. Telephone posts 12 are normally four by ten inches in cross section and have a height of approximately fifty-seven and one-half inches from top to mounting pedestal. Mounting fixtures 49, 59, 69 and 79 are approximately ten by twenty-seven inches and have a depth of approximately four inches.

Although the invention has been described relative to specific embodiments thereof it is not so limited and there are many variations and modifications thereof that will be readily apparent to those skilled in the art in the light of the above teachings.

For example, although specific materials and dimensions are given above for the specific embodiments described herein, the invention is not so limited and other materials and deviations from the specific dimensions employed herein may be utilized in practice of the invention. Also, the adjustment mechanism for adjusting the height of support leg 28 is not confined to the thumb screw and slidable bracket connection therefor described, but could include ratchet, wedging, or any other suitable mechanism for controlling the relative movement of the elongated leg within housing 14.

It is therefore to be understood that, within the scope of the appended claims, the invention may be practiced other than as specifically described herein.

What is claimed as new and desired to be secured by Letters Patent of the United States is:

1. An adapter unit for telephone posts to permit installation of additional telephone units on an existing single rectangular phone post designed for only one or two telephone units, comprising:
   a hollow rectangular housing having four side surfaces and provided with a closed top end and an interior accessible bottom end;
   a top mounting bracket integrally extending horizontally from said closed top end adjacent to a first of said four side surfaces and serving to facilitate attachment of said hollow housing to the top surface of an existing rectangular phone post;
   said first side surface of said hollow rectangular housing being in contact and flush with a side surface of the existing phone post while leaving the remaining three side surfaces of said hollow rectangular housing exposed;
   a bottom mounting bracket integrally extending from said first housing side surface to facilitate attachment of said hollow rectangular housing to the side surface of the existing phone post;
   an elongated support leg having a first end extending from said accessible bottom end of said hollow rectangular housing and a second end extending through said accessible bottom end into said hollow rectangular housing;
   leg height adjustment means provided within said hollow rectangular housing for receiving said second end of said support leg; and
   attachment means disposed on each of the three exposed surfaces of said hollow rectangular housing and selectively arranged to provide attachment of a phone unit on each of said three exposed surfaces.

2. The adapter unit of claim 1 wherein said elongated support leg is provided with the first end extending from said accessible bottom end of said hollow rectangular housing and the second end extending through said accessible bottom end into said hollow rectangular housing;
   a ground engaging plate secured to said first end of said elongated support leg;
   leg height adjustment means provided within said hollow rectangular housing for receiving said second end of said support leg;
   at least one bracket attached to the interior of said hollow housing;
   said at least one bracket slidably receiving said second end of said support leg; and,
   a set screw extending through said at least one bracket to permit selective engagement and retention of said support leg at a desired height.

3. The adapter unit of claim 1 wherein said attachment means disposed on each of the three exposed surfaces of said hollow rectangular housing comprise a plurality of spaced bolts adapted to be received by openings in individual phone mounting fixtures;
   each of said plurality of bolts being threadingly received by tapped openings provided within said hollow housing;
   said tapped openings provided within said hollow rectangular housing consisting of individual tapped nuts welded within said hollow rectangular housing for receiving each of said plurality of bolts; and,
   at least one opening provided through each side surface of said adapter unit to permit passage of telephone and electric wiring therethrough.

4. An adapter unit to permit installation of multiple telephone units on an existing single rectangular phone post designed for only one or two pay telephones comprising:
   a hollow rectangular housing formed of first and second parallel pairs of sides to provide four integral side surfaces;
   said hollow rectangular housing being provided with a closed top end and an open bottom end;
   said existing single rectangular phone post having a top and a bottom end and containing electric and telephone wiring leading to a supply of electricity and telephone service;
   means for attaching one side surface of said hollow rectangular housing to contact and be flush with a side surface of said existing single rectangular phone post;
   means on each of the other three side surfaces of said hollow rectangular housing for securing a separate pay telephone unit to each of the three side surfaces; and
   adjustable height support means carried by said hollow rectangular housing to contact the ground and provide vertical support for said hollow rectangular housing.

5. The adapter unit of claim 4 wherein said means for attaching one of said side surfaces of said hollow rectangular housing to said existing single rectangular phone post includes a top mounting bracket integrally extending horizontally from said closed top end of said hollow rectangular housing and releasably connectible to said top end of said existing single rectangular phone post.

6. The adapter unit of claim 4 wherein said means for attaching one of said side surfaces of said hollow rectangular housing to said existing single rectangular phone post includes a bottom mounting bracket integrally extending vertically from said one of said side surfaces of said hollow rectangular housing; said bottom mounting bracket being in contact with and releasably connectible to said existing single rectangular phone post.

7. The adapter unit of claim 4 wherein said means on each of the other three side surfaces of said hollow rectangular housing for securing a separate pay telephone unit to each of the three side surfaces includes a plurality of spaced bolts extending from each of the three side surfaces, said bolts serving to secure individual telephone mounting fixtures to each of said three side surfaces of said hollow housing and, including a nut for each of said plurality of spaced boles permanently secured within said hollow housing to threadingly receive said bolts.

8. The adapter unit of claim 4 wherein said support means carried by said hollow rectangular housing to contact the ground and provide vertical support for said hollow rectangular housing includes an elongated support leg having a first end extending from said open bottom end of said hollow rectangular housing and a second end extending through said open bottom end into said hollow rectangular housing; a bracket secured within said hollow rectangular housing and slidably receiving said second end of said elongated support leg; and, screw means extending through said bracket and in engagement with said second end of said elongated support leg for selectively restraining relative slidable movement of said elongated support leg within said bracket.

9. The adapter unit of claim 4 including at least one opening provided through each side surface of said hollow rectangular housing, said opening serving as a conduit for the passage of electrical and telephone wiring therethrough.

10. An adapter unit for telephone posts to permit installation of additional telephone units on an existing single rectangular phone post designed for only one or two pay telephone units, comprising:

a hollow rectangular housing having four side surfaces and provided with a closed top end and an open bottom end;

said four side surfaces comprising two unequal width parallel pairs of side surfaces to form a rectangular configuration for said hollow rectangular housing;

bracket means for releasably retaining one of said four side surfaces of said hollow rectangular housing flush with and connected to a surface of an existing rectangular phone post;

attachment means disposed on each of the other three surfaces of said hollow rectangular housing to provide attachment of individual phone units on each of the three surfaces;

said attachment means comprising a plurality of adjustable length spaced bolts extending through each of said three surfaces of said hollow rectangular housing;

said bolts being adapted to engage individual phone mounting fixtures and being arranged in patterns that permit selective height adjustment of phone mounting plates of the telephone units to thereby permit attachment of the telephone units on said adapter unit of varying relative heights for accessibility to handicapped individuals and for curbside drive-up access.

* * * * *